United States Patent [19]

Miyake et al.

[11] Patent Number: 4,618,854
[45] Date of Patent: Oct. 21, 1986

[54] DOUBLE EYE TYPE CRIME PREVENTING SENSOR SYSTEM

[75] Inventors: Ryota Miyake, Shiga; Masami Makino, Osaka, both of Japan

[73] Assignee: Takenaka Engineering Co., Ltd., Kyoto, Japan

[21] Appl. No.: 576,689

[22] PCT Filed: Jun. 3, 1983

[86] PCT No.: PCT/JP83/00182

§ 371 Date: Feb. 3, 1984

§ 102(e) Date: Feb. 3, 1984

[87] PCT Pub. No.: WO83/04316

PCT Pub. Date: Dec. 8, 1983

[30] Foreign Application Priority Data

Jun. 5, 1982 [JP] Japan .................................. 96633

[51] Int. Cl.$^4$ ............................................. G08B 13/18
[52] U.S. Cl. ..................................... 340/567; 250/342; 250/349
[58] Field of Search ............... 340/565, 567; 250/342, 250/349

[56] References Cited

U.S. PATENT DOCUMENTS

| | | | |
|---|---|---|---|
| 3,760,399 | 9/1973 | Schwarz | 340/567 |
| 3,958,118 | 5/1976 | Schwarz | 340/567 X |
| 4,052,716 | 10/1977 | Mortensen | 340/567 X |
| 4,364,030 | 12/1982 | Rossin | 340/567 |

FOREIGN PATENT DOCUMENTS 42165 4/1977 Japan .
42494 3/1982 Japan .

OTHER PUBLICATIONS

"Performance of Narrow-Field, Passive, Infrared Intrusion Detector", *Proceedings of the Society of Photo-Optical Instrumentation Engineers Seminary*, Sep. 1972, Schwarz.

Primary Examiner—James L. Rowland
Assistant Examiner—Brian R. Tumm
Attorney, Agent, or Firm—Morgan & Finnegan

[57] ABSTRACT

A double eye type crime preventing sensor system comprising a pair of detection axes (6) substantially horizontally spaced apart and extending in substantially the same direction in a predetermined space, another pair of detection axes (7) substantially horizontally spaced apart and extending above or below the first pair of detection axes in the corresponding direction, a radiant energy focusing element (4) disposed at the terminal ends of these two pairs of detection axes for focusing radiant energy which comes in along the respective axes, two pairs of radiant energy sensing elements (8) and (9) disposed in the image forming position corresponding to the two pairs of detection axes in the vicinity of the focal point of the focusing element, the two elements (8a), (8b) or (9a), (9b), which constitute each pair of sensing elements (8) and (9) being connected in such a manner as to produce a substantially resultant sensing output when they detect energy in a time differential fashion, and a signal processing circuit for producing a warning when two resultant sensing outputs from the pairs of sensing elements coincide with each other in the element arranging direction producing the energy detection time differential.

4 Claims, 4 Drawing Figures

DOUBLE EYE TYPE CRIME PREVENTING SENSOR SYSTEM

TECHNICAL FIELD

This invention relates to a double eye type crime preventing sensor system and particularly to a (double twin) sensor system wherein two pairs of sensors (twin sensor systems) are disposed in two horizontal rows one above the other along a direction in which persons or objects come in.

BACKGROUND ART

The system that has been frequently used in recent years in sensing devices in entry warning systems is such that two pyroelectric sensors made of ferroelectric substance are horizontally arranged and their output terminals are connected in series or parallel to provide a differential output. Since two detection axes for two sensors (usually the incident axes of concave mirrors for causing extreme infrared rays from an object to be focused on these sensors, or incident axis from the light source to the sensors when near infrared rays or other visible light rays are used) are spaced tens of centimeters at a maximum from each other along a direction in which objects to be detected come in, when a person or an object moves in that direction or in the opposite direction across the detection axes, signals of opposite polarities will be successively produced. However, when a falling object crosses the two detection axes at the same time, the resulting two sensor outputs cancel each other, so that the resultant signal is zero. Thus, in the twin system, a warning can be produced when a person or the like successively crosses term at the level of disposition (detection level) of the two sensors.

The twin system is capable of detecting the direction of movement in a horizontal plane in this manner, as compared with the single eye system, but it has the disadvantages that it cannot judge the height of an entering object and that detection with mere two points (two eyes) is subject to the influence of a disturbance, that is, in twin sensors, if an insect or a small animal or some object moves in the direction of disposition of the sensors at their level of disposition (or detection level), a warning will be issued (erroneous warning). Although detection with only two points is not influenced by substantially uniform air cooling which covers these points, there is a danger that an erroneous warning is produced in response to the cooling or heating of only one point by a draft or direct sunlight, or that reversely an entering person or the like is overlooked.

DISCLOSURE OF THE INVENTION

The present invention is intended to eliminate the drawbacks of the aforesaid conventional twin sensor system and provides a crime preventing sensor system wherein two pairs of sensors are disposed in two horizontal rows one above the other along a direction in which objects come in. The detection levels provided by the twin sensors in the upper and lower rows may be made to correspond to the levels of the breast and either the loins or the legs of a grown-up man, and the signal processing circuit is arranged to produce a warning output when the differential outputs from the respective rows are in phase with each other.

Therefore, according to the present invention, even is a small animal passes by, only the twin sensors in the lower low are actuated, so that no warning signal is produced, while the outputs from the two rows due to differences in detection temperature in the twin sensors caused by a draft or direct sunlight are out of phase with each other and are rarely produced at the same time, so that there is little possibility of an erroneous warning being produced owing to these disturbances.

BEST MODE OF CARRYING OUT THE INVENTION

Figure 1:
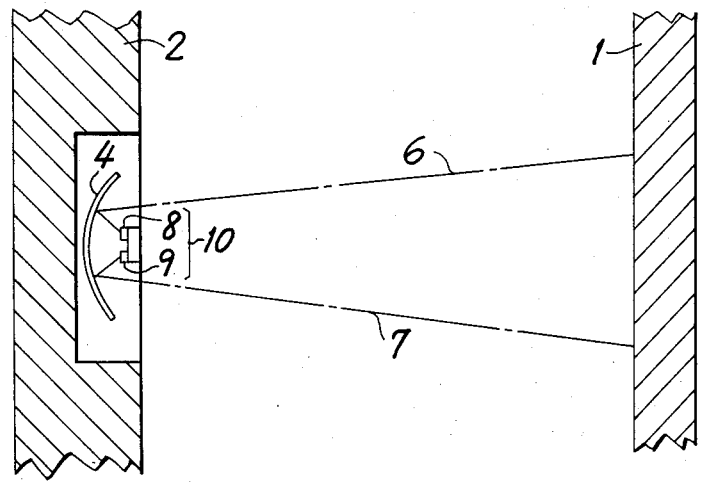
FIG. 1 is a side sectional view showing an example of disposition of a detection system for crime preventing sensor system according to the present invention.

FIG. 1 is a side view showing the arrangement of the sensor system of the present invention, wherein 1 denotes a wall surface which defines the remotest point in the entering object sensing range, and 2 denotes a focusing mirror disposing wall surface opposed thereto. A focusing mirror 4 is an extreme infrared ray focusing mirror attached to the wall surface 2 and adapted to focus extreme infrared rays which are emitted from the body of entering person and strike thereon along pairs of parallel incident optical axes 6 and 7, only one axis being shown in each pair in FIG. 1. The term "parallel" mentioned with reference to the incident optical axes 6 or 7 means that they extend in substantially the same direction, including not only an instance in which the two axes are geometrically parallel (with zero diverging angle ) but also an instance in which they extend with some amount of diverging angle. These detection axes may be upwardly or downwardly inclined with respect to the wall surface 1. The extreme infrared rays focused on and reflected from the mirror 4 and corresponding to the detection axes are received by two sets of twin sensors 8 and 9 and converted to corresponding electric outputs. The respective pairs of sensors, i.e., the twin sensors 8 and 9, serving as blocks, constitute a double twin sensor 10 connected to and supported on the mirror 4 or wall surface 2 suitable support means. As for the sensors 8 and 9, pyroelectric elements of ferroelectric substance sensitive to extreme infrared rays are used in the embodiment, but heat sensitive resistors such as thermistors or other thermoelectric elements may be used.

Figure 2:
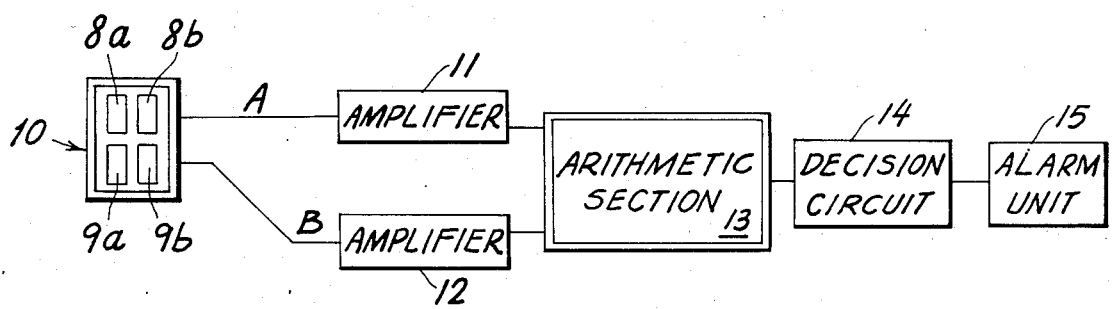
FIG. 2 is a block diagram of a signal processing circuit in the embodiment.

FIG. 2 shows the outline of a circuit arrangement wherein a signal from the so-called double twin sensor 10 is amplified and calculated and a warning is produced. The numerals 11 and 12 denote amplifiers for amplifying differential outputs from the twin sensors 8 and 9 consisting of elements 8a, 8b and 9a, 9b; 13 denotes an arithmetic section for processing the amplified outputs; 14 denotes a decision circuit; and 15 denotes an alarm. The resultant output A from the twin sensors 8a and 8b to be fed to the amplifiers 11 is connected so that the component from the sensor 8a is plus and the component from the sensor 8b is minus, while the resultant output B from the twin sensors 9a and 9b is connected so that the component from the sensor 9a is plus and component from the sensor 9b is minus.

In addition, the amplifiers 11 and 12 may be omitted and instead the arithmetic section 13 may be arranged to have a similar amplifying function.

The arithmetic section 13 is adapted to produce an output signal for actuating the alarm when the output A from the twin sensors 8a and 8b and the output B from the twin sensors 9a and 9b are substantially concurrent and in phase with each other, said arithmetic section calculating $$v = K(|A+B| - |A-B|) \quad (1)$$

and a decision is made according to whether or not the v has a value exceeding a predetermined value. According to this equation, when A and B are both positive or negative, $v > 0$, and the value of $v/K$ becomes equal to twice the smaller of the absolute values of A and B. Thus, when the value inside the parentheses in equation 1 is examined with respect to the relation between the signs and magnitudes of A and B, the following results are obtained.

1. When $A \geq B > 0$, $$v/K = (A+B) - (A-B) = 2B,$$

where $B > 0$, so that $2B = +|2B|$.

2. When $B > A > 0$, $$v/K = (A+B) + (A-B) = 2A,$$

where $A > 0$, so that $2A = +|2A|$.

3. When $A \leq B < 0$, $$v/K = -(A+B) + (A-B) = -2B,$$

where $B < 0$, so that $-2B = +2B$.

4. When $B < A < 0$, $$v/K = -(A+B) - (A-B) = -2A,$$

where $A < 0$, so that $-2A = +|2A|$.

5. When $A > 0 > B$ and $|A| \geq |B|$ $$v/K = +(A+B) - (A-B) = +2B,$$

where $B < 0$, so that $+2B = -|2B|$.

6. When $A > 0 > B$ and $|A| < |B|$, $$v/K = -(A+B) - (A-B) = -2A,$$

where $A > 0$, so that $-2A = -|2A|$.

7. When $A < 0 < B$ and $|A| \geq |B|$, $$v/K = -(A+B) + (A-B) = -2B,$$

where $B > 0$, so that $-2B = -|2B|$.

8. When $A < 0 < B$ and $|A| < |B|$, $$v/K = +(A+B) + (A-B) = +2A,$$

where $A < 0$, so that $+2A = -|2A|$.

As shown above, it is seen that only in the cases 1 through 4 corresponding to the condition of concurrent in-phase outputs, v/K takes the positive value $+|2A|$ or $+|2B|$.

In addition, if A or B is zero (when the upper or lower sensors sense no object), $\pm|2A|$ or $\pm|2B|$ which is the solution to 1 through 8 is zero.

Figure 3:
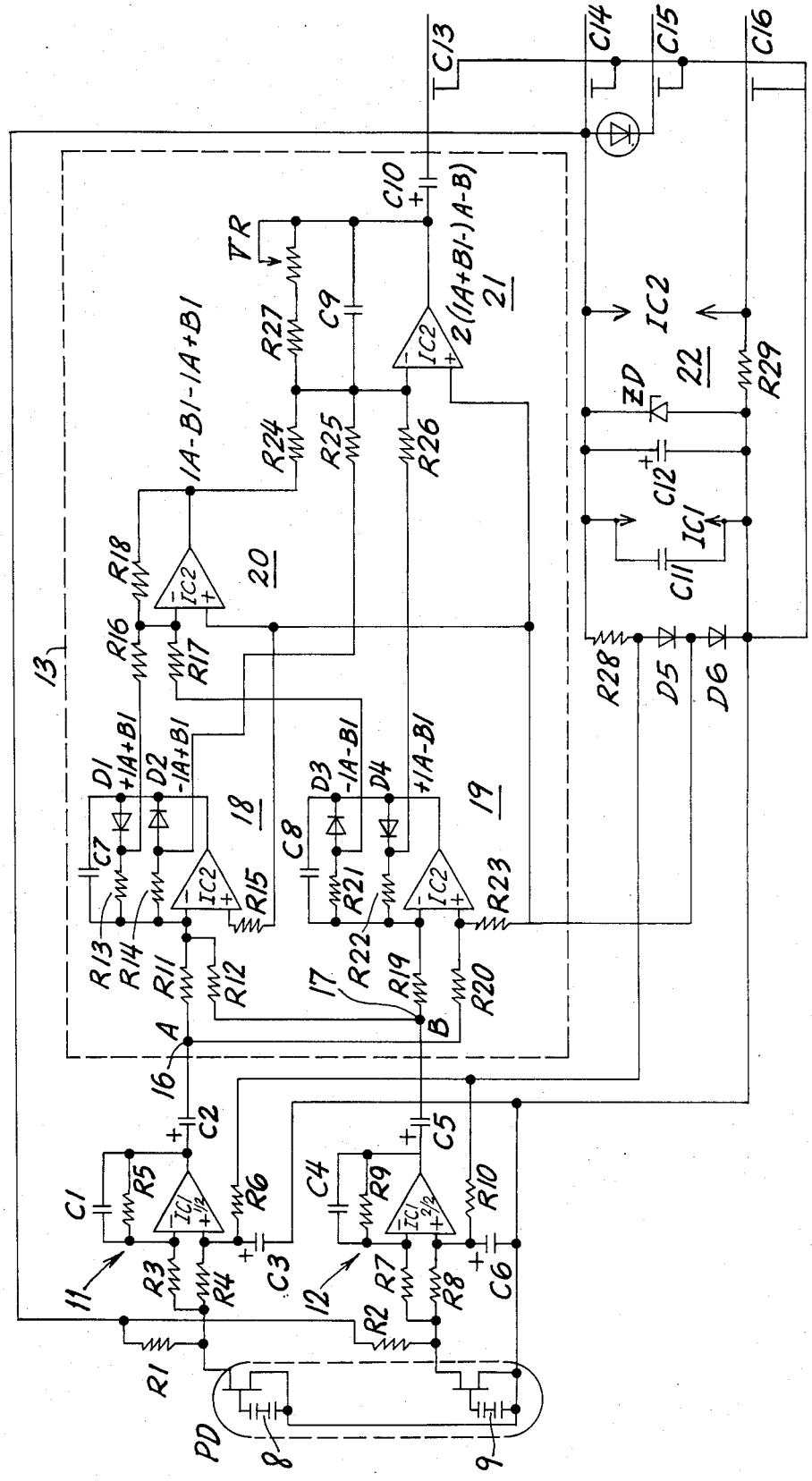
FIG. 3 is a circuit diagram showing the principal portion of the signal processing section.

FIG. 3 is a view showing a concrete arrangement covering the area from the sensors to the arithmetic section 13, wherein the signals A and B fed from the pyroelectric element sensor block PD via the amplifiers 11 and 12 to the input terminals 16 and 17, respectively, undergo the calculations $\pm|A+B|$ and $\pm|A-B|$ in the first and second amplifiers and second amplifiers 18 and 19 of said section 13 and these outputs are then processed by the third amplifier 20 to calculate $|A-B| - |A+B|$, while the fourth amplifier 21 selectively takes in the outputs from the first through third amplifiers 18, 19, and 20 to calculate $2(|A+B| - |A-B|)$. In addition, the pre-amplifiers 11 and 12, and operational amplifiers 18–21 are adapted to be energized by a common source circuit 22.

Figure 4:
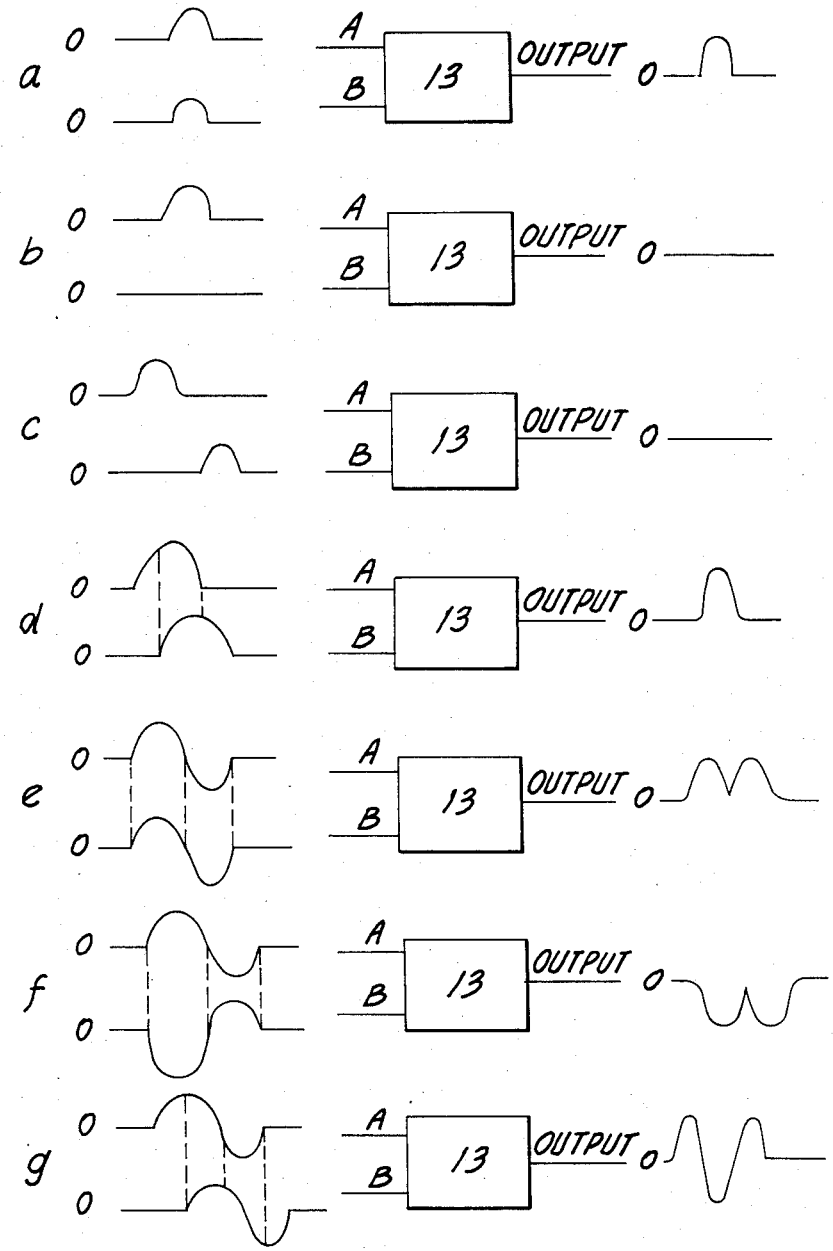
FIG. 4 is a waveform diagram showing the relation between input signals and arithmetic outputs.

Referring back to FIG. 2, $V_o = 2(|A+B| - |A-B|)$ delivered from the arithmetic section 13 is judged in the decision circuit 14 as to its sign, magnitude and the number of peaks or duration. This circuit 14 will produce an energizing signal to actuate the alarm 15 when said circuit judges from the state of Vo that a person has come in or an abnormality has occurred. This is because it is impossible to decide that a person has come in or an abnormality has occurred simply because the value of Vo becomes "positive". This situation is shown in FIG. 4. Typically, when the output has two substantially continuous positive pulses (e and g, in FIG. 4), the decision circuit 14 produces an output signal to energize the alarm.

In FIG. 4A, the inputs A and B are each a single positive signal, corresponding to a case where the upper and lower sensors on the outdoor or permissible side (opposite to the protective side) are actuated at the same time and the arithmetic output is also a positive peak signal. This means that a person or the like reached the vicinity of the sensors and soon returned, so that no warning is given.

In FIG. 4b, the input A is a single pulse and the input B is zero, and in FIG. 4c the input A is a single pulse and the input B is also a single pulse but takes place later than the input A (without overlapping the latter); in each case, the arithmetic output is zero and hence no warning is given. These are thought to be due to a small animal or the like passing across or due to some other noise. In FIG. 4d, the inputs A and B in FIG. 4c are nearer to each other in terms of time to the extent that they overlap each other, causing the production of a positive arithmetic output, corresponding to a case where a person or the like approaches and then returns or some other noise occurs; in this case, it is to be understood that no warning is given.

FIG. 4e shows a signal wherein the two inputs A and B simultaneously change from a positive peak to a negative peak, indicating a case where a person moves along the monitoring direction, with the upper and lower portions of his body simultaneously crossing the upper and lower twin sensors. Therefore, the output is in the form of two consecutive sine waves, and the decision circuit 14 produces a signal to energize the alarm.

Contrarily, in the case of FIG. 4f where the arithmetic output is in the form of two consecutive negative waves, the inputs A and B are positive and negative waves having opposite phases (opposite directions); actually, such a waveform will rarely be produced, but even if produced, such is regarded as a noise and no warning is produced.

FIG. 4g also shows the entry of a person, but unlike the case of FIG. 4e, the input A occurs somewhat earlier than the input B, meaning that the invader is not in an upright walking posture. This, however, is apparently a form of invasion of a person or the like and the arithmetic output comprises two positive pulses, so that the decision circuit 14 produces an output to energize the alarm.

Warnings are produced in the aforesaid manners, and the decision circuit 14 can be used for various purposes including identification of the kind of frequent noises associated with the location of installation of the sensors (completely outdoors or half outdoors) by the tendency of the arithmetic output, and distinction between signal and noise on the basis of the size of the amplitude of the arithmetic output.

In addition, if the input A and B are of the same phase and same size, the output would of course be double the value it takes when there is only A or B; it is thought that theoretically the S/N ratio is improved by $\sqrt{2}$ as compared with the noise which is brought about by either A or B alone.

INDUSTRIAL APPLICABILITY

As has been described so far, the present invention is capable of easily distinguishing between the passing of small animals and the intentional entry of human beings, so that it will be of great service to monitoring in indoor and outdoor areas where noise conditions are severe.

What is claimed is:

1. A passive double eye type crime preventing sensor system comprising:
   a first pair of detection axes substantially horizontally spaced apart and extending in substantially the same direction in a predetermined space;
   a second pair of detection axes substantially horizontally spaced apart and extending above or below the first pair of detection axes in the corresponding direction;
   an energy focusing element including an optical mirror disposed at the terminal ends of these two pairs of detection axes for focusing radiant energy which comes in along the respective axis, said radiant energy being extreme infrared rays emitted from an object to be detected;
   two pairs of radiant energy sensing elements each including a pair of pyroelectric elements of ferroelectric material disposed in the image forming position corresponding to the two pairs of detection axes in the vicinity of the focal point of the focusing element, the two pyroelectric elements comprising each pair of radiant energy sensing elements being connected in such a manner so as to produce a substantially resultant sensing output when they detect energy in a time differential fashion; and
   a signal processing circuit for producing a warning when two resultant sensing outputs from the pairs of radiant energy sensing elements coincide with each other in the element arranging direction, and produced in response to the detection of energy in said time differential fashion, said signal processing circuit including an arithmetic section which receives an analog resultant output signal A from the first pair of said energy sensing elements and an analog resultant output signal B from the second pair of said energy sensing elements, calculates $K(|A+B| - |A-B|)$ (where K is a constant), and, if the result of this calculation is a positive value, finds that the time differential detecting directions associated with said two pairs of sensing elements coincide with each other.

2. A passive double eye-type crime preventing sensor system comprising:
   an energy focusing element having an optical mirror with a focal point disposed at the terminal ends of first and second pairs of detection axes for focusing extreme infrared rays emitted from an object to be detected, said first pair of detection axes being substantially horizontally spaced apart and extending in substantially the same direction in a predetermined space, said second pair of detection axes being substantially horizontally spaced apart and extending a distance from said first pair of detection axes;
   first and second pairs of infrared ray sensing elements, each including pyroelectric elements of ferroelectric material disposed in an image forming position corresponding to said first and second pairs of detection axes in the vicinity of said focal point of said optical mirror, said two pyroelectric elements comprising each pair of infrared ray sensing elements being connected so as to provide a substantially resultant sensing output signal when said pyroelectric elements detect energy in a time differential fashion; and
   signal processing means for producing a warning signal when two resultant sensing output signals from said pairs of infrared ray sensing elements coincide with each other in the element arranging direction, and produced in response to the detection of energy in said time differential fashion, said signal processing means including an arithmetic means for receiving a first analog resultant sensing output signal A from said first pair of energy sensing elements and a second analog resultant output signal B from said second pair of said energy sensing elements, and for generating a computed output signal corresponding to $K(|A+B| - |A-B|)$, where K is a constant, and, if said computed output signal corresponding to the calculation is a positive value, generating a coincidence output signal indicating that the time differential detecting directions associated with said two pairs of sensing elements coincide with each other.

3. The system of claim 2; wherein said energy focusing element is arranged so that said second pair of detection axes is above said first pair of detection axes.

4. The system of claim 2; wherein said energy focusing element is arranged so that said first pair of detection axes is above said second pair of detection axes.

* * * * *